(12) United States Patent
Butchart

(10) Patent No.: US 10,269,460 B2
(45) Date of Patent: Apr. 23, 2019

(54) CONTROL ROD POSITION INDICATOR

(71) Applicant: NuScale Power, LLC, Corvallis, OR (US)

(72) Inventor: Paul Butchart, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 653 days.

(21) Appl. No.: 14/814,904

(22) Filed: Jul. 31, 2015

(65) Prior Publication Data

US 2017/0032855 A1    Feb. 2, 2017

(51) Int. Cl.
    *G21C 17/00*    (2006.01)
    *G21C 17/12*    (2006.01)
    *G21C 7/36*    (2006.01)

(52) U.S. Cl.
    CPC .............. *G21C 17/12* (2013.01); *G21C 7/36* (2013.01); *Y02E 30/39* (2013.01)

(58) Field of Classification Search
    CPC .......... G21C 7/12; G21C 17/00; G21C 17/06; G21C 17/10; G21C 17/12; G21C 17/116
    See application file for complete search history.

(56) References Cited

U.S. PATENT DOCUMENTS

| | | |
|---|---|---|
| 3,656,074 A | 4/1972 | Bevilacqua |
| 4,711,757 A | 12/1987 | Feilchenfeld |
| 4,778,645 A | 10/1988 | Altman et al. |
| 6,380,734 B1 | 4/2002 | Chari |
| 8,351,561 B2 | 1/2013 | Hashemian et al. |
| 8,811,561 B2 | 8/2014 | Stambaugh et al. |
| 8,824,617 B2 | 9/2014 | Sexton et al. |
| 8,971,477 B2 | 3/2015 | Thome et al. |
| 9,025,720 B2 | 5/2015 | Tylman |
| 2010/0316177 A1 | 12/2010 | Stambaugh et al. |
| 2012/0155596 A1* | 6/2012 | Kowles ............... G01D 5/2515 376/258 |
| 2013/0177123 A1 | 7/2013 | Sexton |
| 2013/0223579 A1 | 8/2013 | Allen et al. |

OTHER PUBLICATIONS

International Search Report; PCT/US2016/021595; dated Jun. 21, 2016.
International Preliminary Report on Patentability for PCT/US2016/021595; dated Feb. 15, 2018; 9 pages.

* cited by examiner

*Primary Examiner* — Marshall P O'Connor
(74) *Attorney, Agent, or Firm* — Schwabe Williamson & Wyatt

(57) ABSTRACT

A rod position indication system includes a drive rod operably coupled to a control rod that is configured to be both withdrawn from and inserted into a reactor core. A number of sensing devices are arranged along a path of the drive rod, and an end of the drive rod passes by or through one or more of the sensing devices in response to movement of the control rod relative to the reactor core. The sensing devices are arranged into a plurality of groups, and each group includes two or more of the sensing devices electrically coupled together. The rod position indication system further includes a control rod monitoring device electrically coupled to each group of sensing devices by a routing wire.

15 Claims, 11 Drawing Sheets

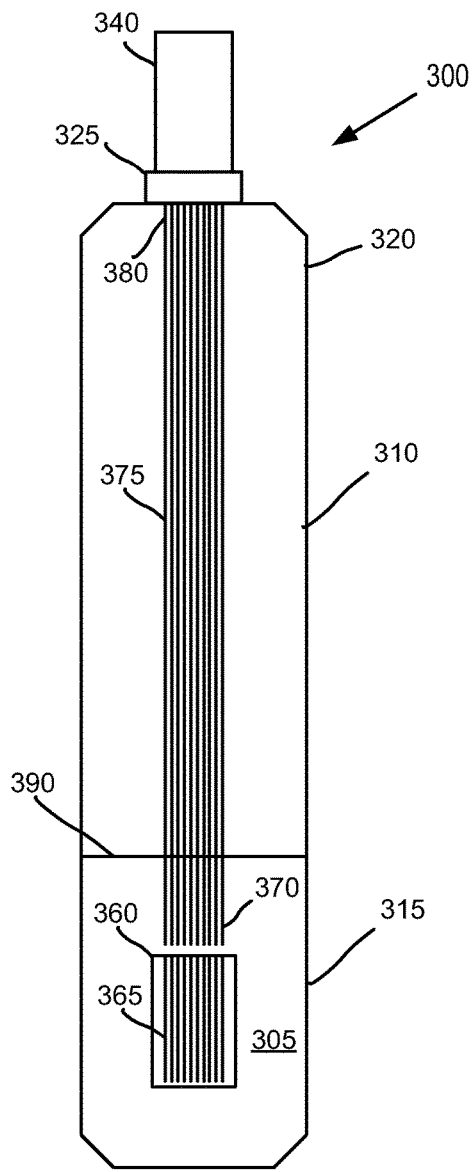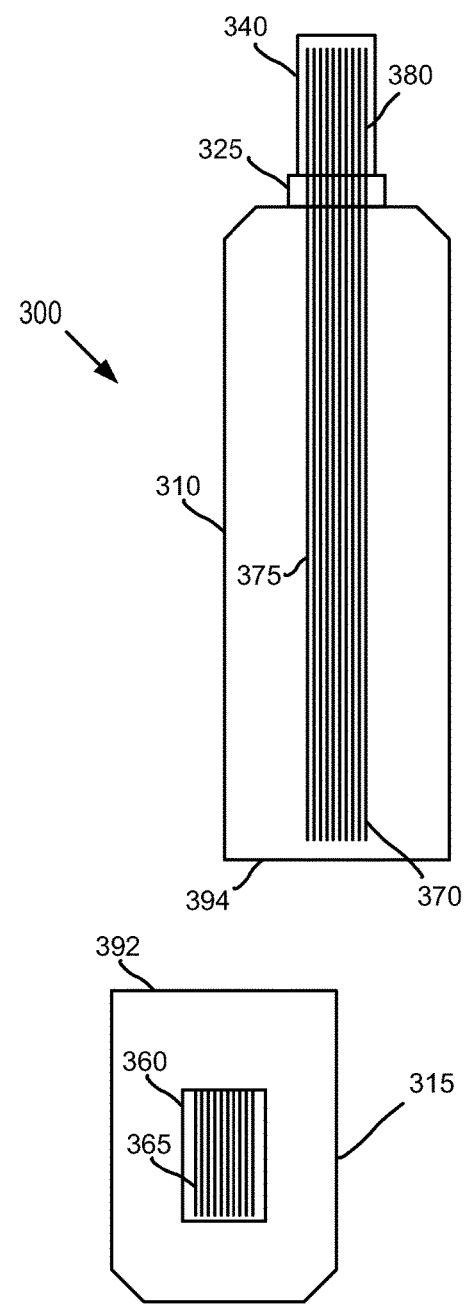
FIG. 3A
FIG. 3B

CONTROL ROD POSITION INDICATOR

GOVERNMENT INTEREST

This invention was made with Government support under Contract No. DE-NE0000633 awarded by the Department of Energy. The Government has certain rights in this invention.

TECHNICAL FIELD

This disclosure generally relates to systems, devices, structures, and methods associated with control rod position indicator systems for a nuclear power reactor.

BACKGROUND

In many types of pressurized water reactors (PWR) and boiling water reactors (BWR), a reactor core may contain a large number of fuel rods that are several meters in height. The reactor core may be surrounded by water contained within a reactor vessel. Additionally, the reactor may contain one or more control rod drive mechanism (CRDM) assemblies including a number of control rod assemblies that may be inserted into, and withdrawn from, the reactor core to control the overall power level of the reactor.

The CRDM assembly may include a number of magnetic coils operable to raise and lower the control rod assemblies. For example, the magnetic coils may be used to move the control rod assemblies out of the reactor core in incremental steps. Many CRDM assemblies are designed such that a loss of electrical power will result in the magnetic coils automatically releasing the control rod assemblies into the reactor core, in what is referred to as a reactor trip or scram.

The CRDM assembly may additionally comprise sensing coils aligned along a direction of motion of a control rod which, when actuated, may pass through the center of the sensing coils as the control rod is moved. In known CRDM assemblies, the sensing coils may be associated with a control rod position indicator (RPI) assembly. The RPI assembly may comprise numerous sensing coils. Each sensing coil may comprise or be associated with two terminals. In an example for an RPI assembly that includes 78 sensing coils, there may be 156 terminals and/or 156 wires associated with each of the control rods. Additionally the CRDM assembly may be associated with dozens of control rods, which has the effect of similarly multiplying the total number of wires in the RPI assembly.

Some known RPI assemblies may be located within a containment structure that houses the reactor vessel. The wires associated with the RPI assembly may have one end attached at or near the top of the reactor vessel, and another end that passes through the containment structure to transmit the information to an external processing device and/or monitor. A number of penetrations through the containment structure may therefore be associated with the multitude of wires of the RPI assembly.

Additionally, known RPI assemblies may comprise or be associated with two separate power supplies. Each of the power supplies may be configured to supply voltage to half of the sensing coils. Utilizing two power supplies may be configured to allow the sensing coils to continue operating at lower resolution if one of the power supplies is shut off or otherwise becomes inoperable.

Some RPI assemblies may utilize a dual common bus power supply. Each of the sensing coils corresponding to the dual common bus power supply may have one of its two corresponding terminations connected to the bus. The other termination may be separately fed out of the containment structure for processing. Although the number of terminations passing through the containment structure may be approximately half as many as compared to RPI assemblies associated with two power supplies, there may still be 78 or more wires that need to pass through the containment structure for the example RPI assembly provided above, having 78 sensing coils.

Accordingly, the large number of wires associated with known RPI assemblies creates a significant challenge to maintain a sealed containment structure due to the number and/or size of the penetrations that are required to pass the wires through the containment structure. Additionally, the large number of wires causes significant complexity and a corresponding amount of time to label, connect, disconnect, route, or otherwise handle the wires during manufacture, installation, maintenance, operation, and/or decommissioning of the reactor module.

This application addresses these and other problems.

SUMMARY

A rod position indication system is disclosed herein, comprising a drive rod operably coupled to a control rod that is configured to be both withdrawn from and inserted into a reactor core. A number of sensing devices may be linearly arranged along a path of the drive rod, and an end of the drive rod may be configured to pass by or through one or more of the sensing devices in response to the movement of the control rod with respect to the reactor core. The sensing devices may be arranged into a plurality of groups, and each group may include two or more of the sensing devices electrically coupled together. In some examples, the two or more of the sensing devices may be electrically coupled together in series. The rod position indication system may further comprise a control rod monitoring device electrically coupled to each group of sensing devices by a separate routing wire.

A method of determining a position of a control rod is disclosed herein, comprising moving the control rod relative to a reactor core. The control rod may be operably coupled to a drive rod of a control rod drive mechanism, and the drive rod may be configured to move relative to a number of sensing devices associated with a rod position indication (RPI) apparatus in response to withdrawing the control rod. A change in electrical property of a first sensing device may be detected based, at least in part, on an end of the drive rod located proximately to the first sensing device. The first sensing device may be associated with a first group of sensing devices electrically coupled together.

The method may further comprise receiving, at the RPI apparatus, a first signal associated with the change in electrical property of the first sensing device. Additionally, a change in electrical property of a second sensing device may be detected based, at least in part, on the end of the drive rod located proximately to the second sensing device. The second sensing device may be associated with a second group of sensing devices electrically coupled together. In some examples, one or both of the first group of sensing device and the second set of sensing devices may be separately coupled together in series. The RPI apparatus may be configured to receive a second signal associated with the change in electrical property of the second sensing device. The first signal may be compared to the second signal to determine the position of the drive rod relative to the number of sensing devices.

An apparatus for performing a method of determining a position of a control rod in a nuclear reactor is also disclosed herein.

BRIEF DESCRIPTION OF THE DRAWINGS

FIG. 3A illustrates an example reactor pressure vessel and control rod drive mechanism assemblies.

FIG. 3B illustrates the example reactor pressure vessel of FIG. 3A partially disassembled.

DETAILED DESCRIPTION

Figure 1:
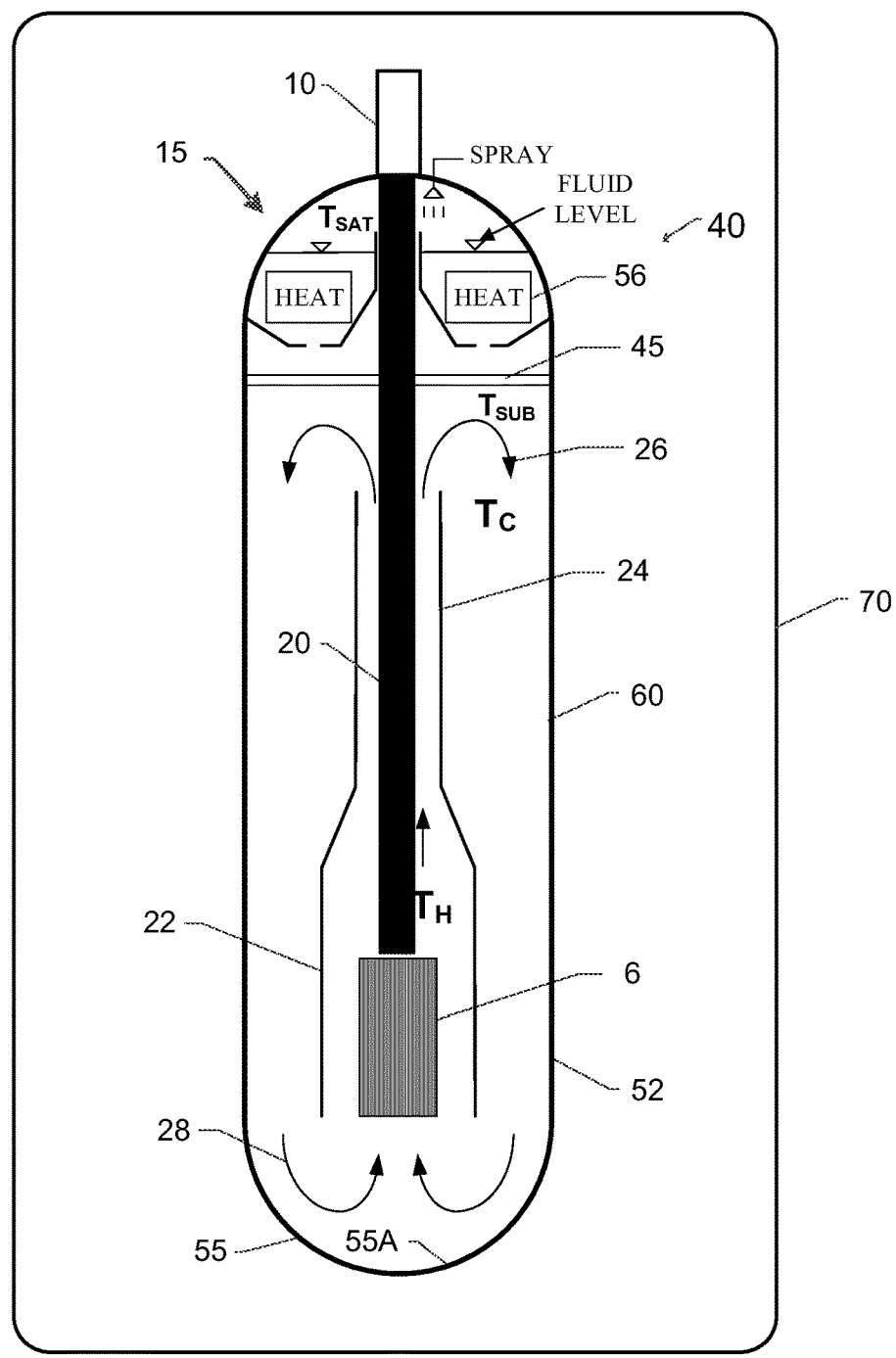
FIG. 1 illustrates a cross-sectional view of an example system comprising an integral reactor pressure vessel.

FIG. 1 illustrates a cross-sectional view of an example reactor module 40 comprising a reactor pressure vessel 52. Reactor pressure vessel 52 may house a reactor core 6 located near a lower head 55 of the reactor pressure vessel 52. A riser section 24 is located above the reactor core 6. Coolant circulates past the reactor core 6 to become high-temperature coolant TH and then continues up through the riser section 24 where it is directed back down the annulus and cooled off by a heat exchanger to become low-temperature coolant TC. A control rod drive mechanism (CRDM) 10 operatively coupled to a number of drive shafts 20 may be configured to interface with a plurality of control rod drive assemblies located in reactor core 6.

The reactor pressure vessel baffle plate 45 may be configured to direct the coolant (shown as coolant flow 26) towards the lower head 55 of the reactor pressure vessel 52. A surface of the reactor pressure vessel baffle plate 45 may come into direct contact with and deflect the coolant that exits the riser section 24. In some examples, the reactor pressure vessel baffle plate 45 may be made of stainless steel or other materials and/or may be formed into an ellipsoidal shaped surface.

The lower head 55 of the reactor pressure vessel 52 may comprise an ellipsoidal, domed, concave, or hemispherical portion 55A. The ellipsoidal portion 55A may be configured to direct the coolant (shown as coolant flow 28) towards the reactor core 6. The ellipsoidal portion 55A may increase flow rate and promote natural circulation of the coolant through the reactor core 6.

The reactor pressure vessel baffle plate 45 is illustrated as being located between the top of the riser section 24 and a pressurizer region 15 located in an upper head 56 of the reactor pressure vessel 52. The pressurizer region 15 is shown as comprising one or more heaters and spray nozzles configured to control a pressure, or maintain a steam dome, within the upper head 56. Coolant located below the reactor pressure vessel baffle plate 45 may comprise relatively sub-cooled coolant at temperature TSUB, whereas coolant in the pressurizer region 15 in the upper head 56 of the reactor pressure vessel 52 may comprise substantially saturated coolant at temperature TSAT. A fluid level of the coolant is shown as being above the reactor pressure vessel baffle plate 45, and within the pressurizer region 15, such that the entire volume between the reactor pressure vessel baffle plate 45 and the lower head 55 of the reactor pressure vessel 52 may be full of coolant during normal operation of the system 40.

A lower riser 22 may support one or more control rod guide tubes or instrumentation structures. The one or more control rod guide tubes or instrumentation structures may be attached to the riser section 24, and serve to guide control rod assemblies that are inserted into, or removed from, the reactor core 6, or provide support for instrumentation devices located inside the reactor pressure vessel 52. In some examples, control rod drive shafts may pass through reactor pressure vessel baffle plate 45 and through riser section 24 in order to control the position of the control rod assemblies relative to reactor core 6

Reactor pressure vessel 52 may comprise a flange by which lower head 55 may be removably attached to a vessel body 60 of reactor pressure vessel 52. In some examples, when the lower head 55 is separated from vessel body 60, such as during a refueling operation, riser section 24, baffle plate 45, and other internals may be retained within vessel body 60, whereas reactor core 6 may be retained within lower head 55. Additionally, vessel body 60 may be housed within a containment vessel 70.

Figure 2:
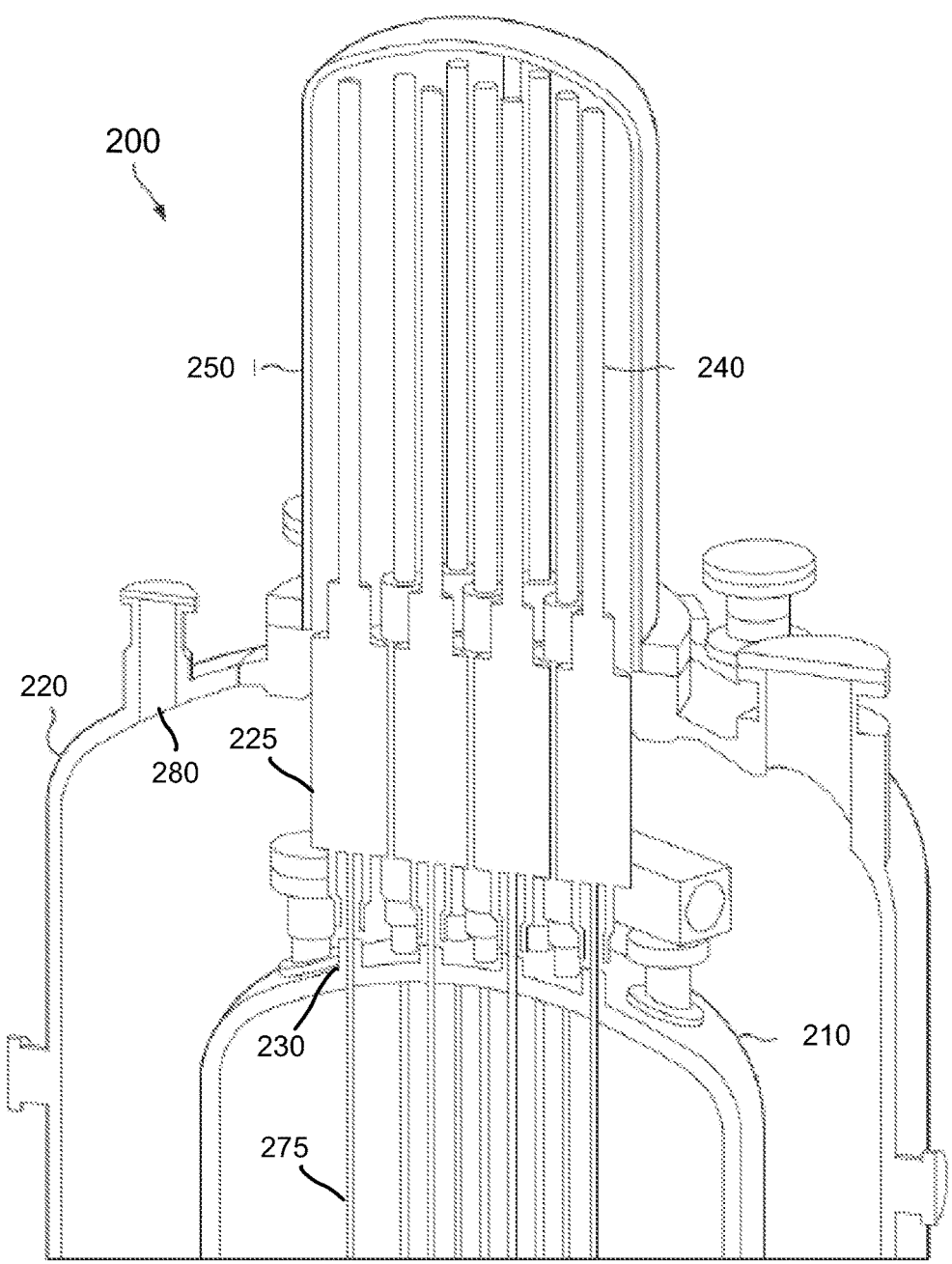
FIG. 2 illustrates an upper cross-sectional view of a reactor module and an example control rod drive mechanism assembly.

FIG. 2 illustrates an upper cross-sectional view of a reactor module 200 and an example control rod drive mechanism (CRDM) assembly 225. Reactor module 200 may comprise an upper containment vessel 250 housing at least a portion of the CRDM assembly 225. For example, a plurality of drive shaft housings 240 may be located within upper containment vessel 250. Additionally, a plurality of drive shafts 275 associated with CRDM assembly 225 may be located in a reactor pressure vessel 210 that is housed in a main containment vessel 220. Drive shaft housings 240 may be configured to house at least a portion of drive shafts 275 during operation of reactor module 200. In some examples, essentially all of the CRDM assembly 225 may be housed within main containment vessel 220.

Upper containment vessel 250 may be removably attached to main containment vessel 220. By removing upper containment vessel 250, the overall size and/or volume of reactor module 200 may be reduced, which may affect peak containment pressure and/or water levels. In addition to reducing the overall height of reactor module 200, the removal of upper containment vessel 250 from main containment vessel 220 may further reduce the weight and shipping height of reactor module 200. In some example reactor modules, several tons of weight can be removed for each foot that the overall height of reactor module 200 is decreased.

Reactor pressure vessel 210 and/or main containment vessel 220 may comprise one or more steel containment vessels. Additionally, main containment vessel 220 may comprise one or more flanges, similar to flange 80 (FIG. 1), by which a top head or a bottom head of main containment vessel 220 may be removed from the containment vessel body, such as during a refueling operation.

During refueling, reactor module 200 may be relocated from an operating bay into a refueling bay, and a series of disassembly steps may be performed on the reactor module 200. The operating bay may be connected to the refueling bay by water, such that reactor module 200 is transported under water. Main containment vessel 220 may be disassembled, e.g., the top or bottom head may be separated from the containment vessel body, in order to gain access to CRDM assembly 225 and/or to reactor pressure vessel 210. At this stage of refueling, reactor pressure vessel 210 may remain completely sealed to the surrounding water in the refueling bay. In some examples, an upper portion of CRDM assembly 225, such as the plurality of drive shaft housings 240, may be located above water to facilitate access to CRDM assembly 225 in a dry environment. In other examples, the entire CRDM assembly 225 may be submerged in the pool of water in the refueling bay.

CRDM assembly 225 may be mounted to an upper head of reactor pressure vessel 210 by a mounting structure 230. Mounting structure 230 may be configured to support CRDM assembly 225 when main containment vessel 220 is partially or completely disassembled during the refueling operation. Additionally, CRDM assembly 225 may be configured to support and/or control the position of drive shafts 275 within reactor pressure vessel 210.

Reactor pressure vessel 210 may comprise a substantially capsule-shaped vessel similar to reactor pressure vessel 52 (FIG. 1). In some examples, reactor pressure vessel 210 may be approximately 20 meters in height. Drive shafts 275 may extend from CRDM assembly 225, located at the upper head of reactor pressure vessel 210, into a lower head of reactor pressure vessel 210, so that they can be connected to control rod assemblies that are inserted into the reactor core. The distance from the upper head of reactor pressure vessel 210 to the reactor core, such as reactor core 6 (FIG. 1), while less than the overall height of reactor pressure vessel 210, may therefore result in the length of drive shafts 275 also being approximately 20 meters in length or, in some examples, somewhat less than the height of reactor pressure vessel 210.

Main containment vessel 220 and/or upper containment vessel 250 may include one or more penetrations, such as penetration 280. The one or more penetrations may provide through-holes for instrumentation cabling or wires to pass through the containment wall. For example, wiring associated with CRD assembly 225, such as wiring for a rod position indicator system located inside of the containment vessel, may pass through the penetrations to operably couple CRD assembly 225 to a processor or monitor located outside of the containment vessel. The penetrations may be sealed to the environment, such that any air or water located outside of the containment vessel is not allowed to enter the containment vessel through the penetrations. In some examples, penetration 280 may be associated with a wire connector, configured as circular plate sealed to the containment vessel, which may be used to route a plurality of wires.

FIG. 3A illustrates cross-sectional view of an example reactor pressure vessel 300 and a CRDM assembly 325. CRDM assembly 325 may be mounted to an upper head 320 of reactor pressure vessel 300 and configured to support a plurality of drive shafts 375 that extend through the length of a vessel body 310 of reactor pressure vessel 300 towards a reactor core 360 located in a lower head 315 of reactor pressure vessel 300. In some examples, lower head 315 may be removably attached to vessel body 310 at a flange 390, such as by a plurality of bolts.

In addition to housing a number of fuel rods, reactor core 360 may be configured to receive a plurality of control rod assemblies 365 that may be movably inserted between the fuel rods to control the power output of reactor core 360. When reactor core 360 is generating power, lower ends 370 of drive shafts 375 may be connected to control rod assemblies 365. Additionally, CRDM assembly 325 may be configured to control the location of control rod assemblies 365 within reactor core 360 by moving drive shafts 375 either up or down within reactor pressure vessel 300.

Upper ends 380 of drive shafts 375 may be housed in a CRDM housing 340 located above upper head 320 of reactor pressure vessel 300, such as when control rod assemblies 365 are removed from reactor core 360. In some examples, CRDM housing 340 may comprise a single containment structure configured to house upper ends 380 of drive shafts 375. In other examples, CRDM housing 340 may comprise individual housings for each of the drive shafts 375.

Lower ends 370 of drive shafts 375 are shown disconnected from control rod assemblies 365, such as may be associated with a refueling operation of reactor core 365. During an initial stage of the refueling operation, lower head 315 may remain attached to vessel body 310 while drive shafts 375 are disconnected from control rod assemblies 365. The reactor pressure vessel 310 may remain completely sealed to the surrounding environment, which in some examples may comprise a pool of water that at least partially surrounds reactor pressure vessel 310, during the initial stage of the refueling operation.

CRDM assembly 325 may comprise a remote disconnect mechanism by which drive shafts 375 may be disconnected from control rod assemblies 365 without opening or otherwise disassembling reactor pressure vessel 300. In some example, reactor pressure vessel 300 may form a sealed containment region 305 that surrounds reactor core 360, control rod assemblies 365, and lower ends 370 of drive shafts 375. By remotely disconnecting drive shafts 375, control rod assemblies 365 may remain within reactor core 360 when drive shafts 375 are withdrawn, at least partially, into CRDM housing 340.

FIG. 3B illustrates the example reactor pressure vessel 300 of FIG. 3A partially disassembled. During the refueling operation, lower head 315 may be separated from vessel body 310 of reactor pressure vessel 300. In some examples, lower head 315 may be held stationary in a refueling station while vessel body 310 is lifted up by a crane and moved away from lower head 315 to facilitate access to reactor core 360.

Drive shafts 375 are shown in a retracted or withdrawn position, such that lower ends 370 may be completely retained within vessel body 310 and/or CRDM housing 340. For example, CRDM assembly 325 may be configured to raise lower ends 370 of drive shafts 375 above a lower flange 394 used to mount vessel body 394 together with an upper flange 392 of lower head 315. Withdrawing lower ends 370 of drive shafts 375 into vessel body 310 may provide additional clearance between lower flange 394 and upper flange 392 during the refueling operation and further may keep drive shafts 375 from contacting external objects or getting damaged during transport and/or storage of vessel body 310. Additionally, upper ends 380 of drive shafts 375 may similarly be housed and/or protected by CRDM housing 340 when drive shafts 375 are in the retracted or withdrawn position.

As discussed above, control rod assemblies 365 may remain completely inserted in reactor core 360 during some or all of the refueling operation. In some examples, maintaining the insertion of control rod assemblies 365 within reactor core 360 may be dictated by nuclear regulatory and/or safety considerations.

Figure 4:
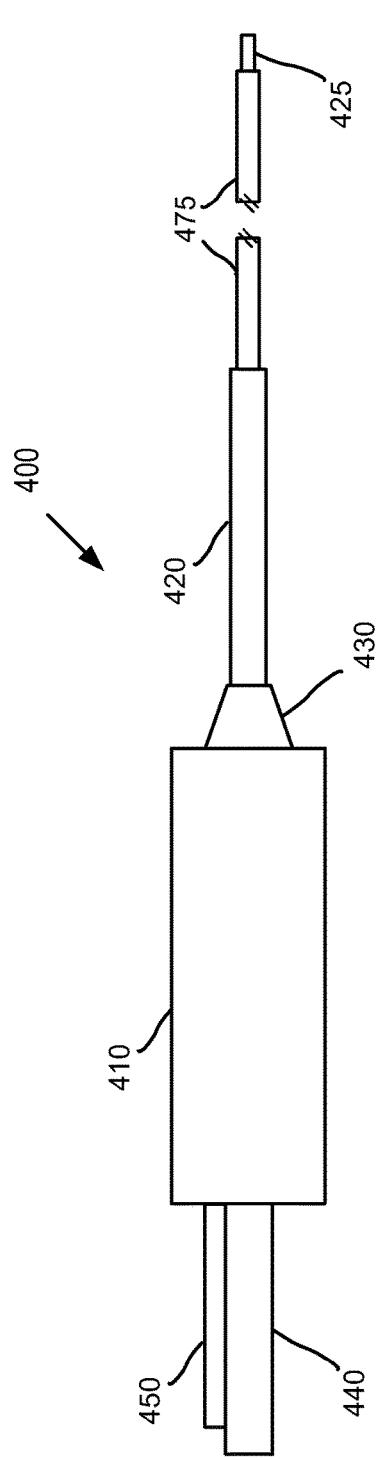
FIG. 4 illustrates an example control rod drive mechanism assembly.

FIG. 4 illustrates a block diagram of an example control rod drive mechanism (CRDM) assembly 400. CRDM assembly 400 may comprise a drive mechanism 410 configured to raise and lower a drive shaft 475. Drive shaft 475 is shown with broken lines to indicate the relative length may vary depending on the distance (e.g., several feet to twenty or more meters) between drive mechanism 410 and the control rod assemblies contained in the reactor core. A lower end of drive shaft 475 may comprise a coupling mechanism 425. The coupling mechanism 425 may be configured to removably couple drive shaft 475 to the top of a control rod assembly.

Additionally, CRDM assembly 400 may comprise a pressure housing 420, a latch assembly 430, a drive shaft housing 440, and a rod position indication (RPI) system 450. CRDM assembly 400 may be mounted to a reactor pressure vessel. Pressure housing 420 may be configured to provide a pressure boundary about drive shaft 475 at a penetration point through the reactor pressure vessel. In some examples, pressure housing 420 may be inserted into and/or welded to the upper head of a reactor pressure vessel, such as upper head 320 (FIG. 3). Drive shaft housing 440 may be configured to house an upper end of drive shaft 475 as it is raised from the reactor core. Additionally, the RPI system 450 may be configured to determine the position of drive shaft 475 as it is removed from, or inserted into, the reactor core.

Figure 5:
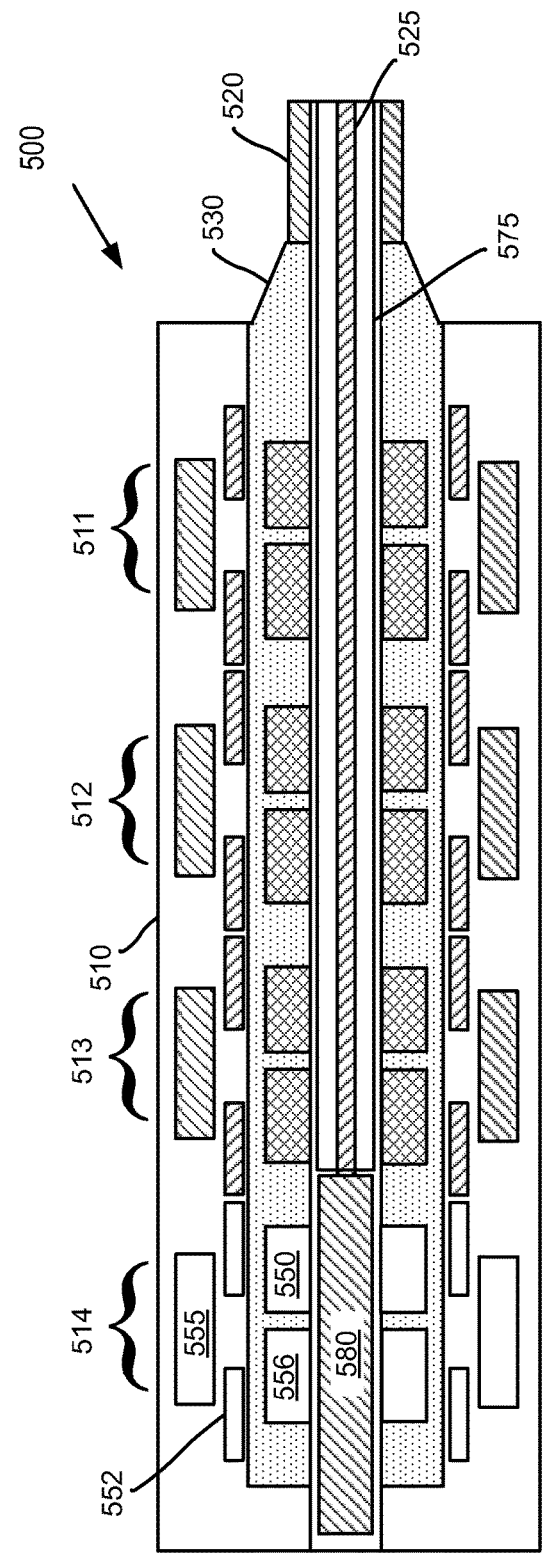
FIG. 5 illustrates a cross-sectional view of an example control rod drive mechanism assembly including a control rod drive disconnect system.

FIG. 5 illustrates an example CRDM assembly 500 comprising a control rod drive disconnect system. A drive mechanism 510 may be configured to raise and lower a drive shaft 525 through a pressure housing 520 and/or through a latch assembly 530. In some examples, latch assembly 530 may be contained within pressure housing 520.

Latch assembly 530 may comprise a plurality of latches and/or magnetic plungers configured to interact with a number of electro-magnetic coil arrangements, such as a first magnetic coil assembly 511, a second magnetic coil assembly 512, and a third magnetic coil assembly 513. Latch assembly 530 may be configured to incrementally or continuously vary the position of drive shaft 575 by energizing or otherwise actuating one or more of the number of magnetic coil assemblies 511, 512, 513. In some examples, one or more of the magnetic coil assemblies 511, 512, 513 may comprise and/or be referred to as a stationary gripper coil, a moveable gripper coil, and a lift coil, respectively.

Additionally, a fourth magnetic coil assembly 514 comprising a magnetic coil 555, one of more flux rings 552, and one or more magnetic poles 556 may be configured to interact with a latch assembly 550. Magnetic coil assembly 514 and latch assembly 550 may be configured to move and/or otherwise control the position of a CRD disconnect apparatus 580 relative to drive shaft 575. In some examples, latch assembly 550 may be housed within latch assembly housing 530 and magnetic coil 555 may be located outside of latch assembly housing 530.

CRD disconnect apparatus 580 be operably coupled to a disconnect rod 525 at least partially housed within drive shaft 575. Additionally CRD disconnect apparatus 580 may be configured to move and/or to allow movement of disconnect rod 525 relative to drive shaft 575. For example, the control rod drive disconnect system may be configured to hold drive shaft 575 in a relatively fixed position and to move disconnect rod 525 within the stationary drive shaft 575. In another example, the control rod drive disconnect system may be configured to hold disconnect rod 525 in a relatively fixed position and to move drive shaft 575.

CRDM assembly 500 may be configured to controllably position drive shaft 575 located at least partially within a reactor pressure vessel. An upper end of drive shaft 575 may be located outside of the reactor pressure vessel. One or more of the plurality of latch devices associated with magnetic coil arrangements 511, 512, 513 may be configured to engage, hold, and/or move the upper end of drive shaft 575.

A lower end of drive shaft 575 may be operably coupled to the control rod assembly in a sealed containment region of the reactor pressure vessel. Latch assembly 550 and/or CRD disconnect apparatus 580 may be configured to engage disconnect rod 525. In response to an actuation of CRD disconnect apparatus 580 while the lower end of drive shaft 575 remains in the sealed containment region, the lower end of drive shaft 575 may be uncoupled from the control rod assembly due to a relative movement between disconnect rod 525 and drive shaft 575. The reactor pressure vessel may comprise a lower head removably attached to a vessel body, as illustrated in FIGS. 3A and 3B. CRD disconnect apparatus 580 may be actuated while the lower head remains attached to the vessel body.

In some examples, the control rod drive disconnect system described with reference to magnetic coil assembly 514, latch assembly 550, and CRD disconnect apparatus 580 may comprise an electro-magnetic coil, a magnetic plunger, and one or more grippers and/or latches similar to components used with the CRDM coil stacks and/or other components that may be used to control the overall position of drive shaft 575, such as one or more of magnetic coil assemblies 511, 512, 513.

Figure 6:
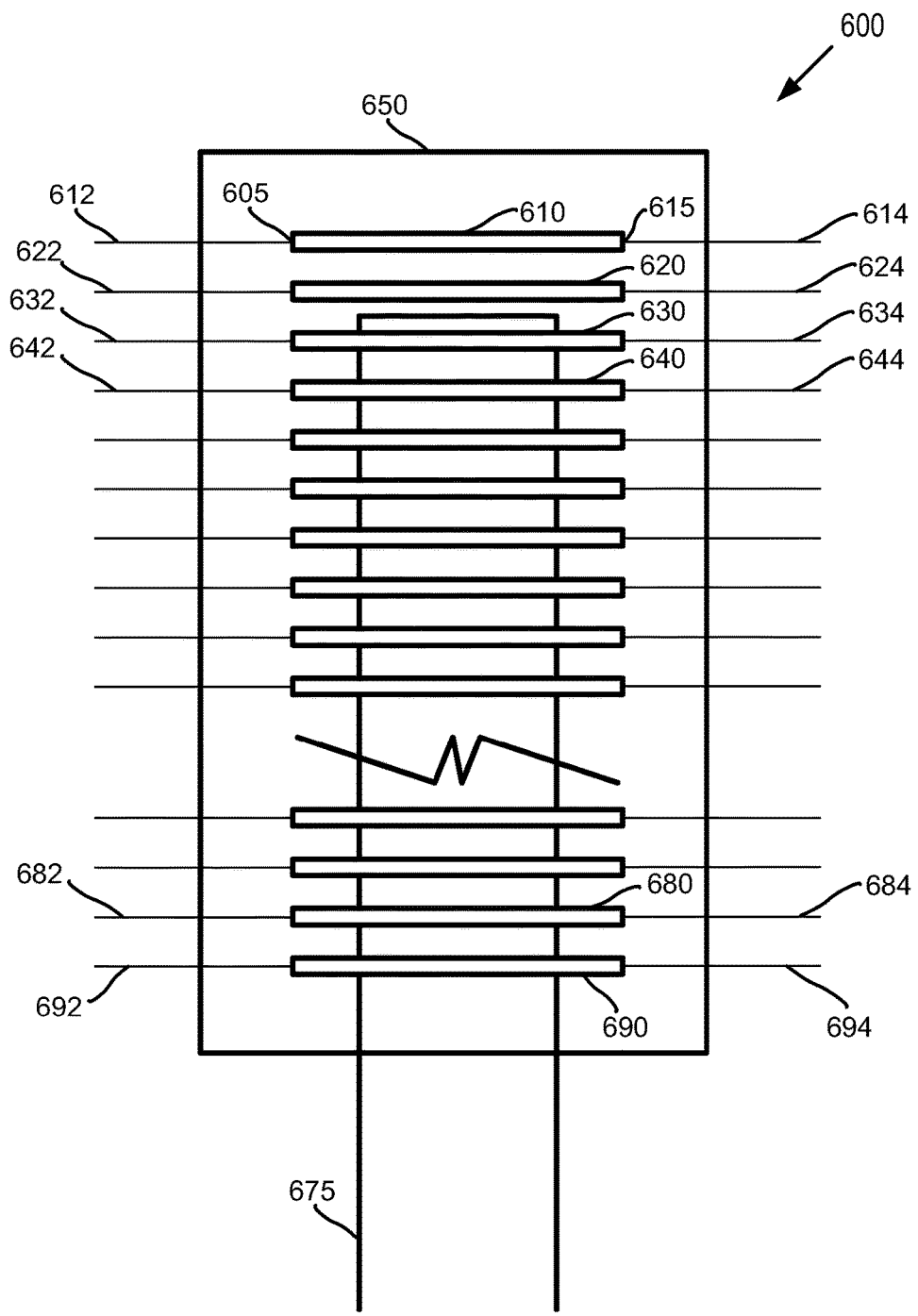
FIG. 6 illustrates an example rod position indication system.

FIG. 6 illustrates an example rod position indicator (RPI) system 600. RPI system 600 may comprise a plurality of sensing coils, such as a first sensing coil 610, a second sensing coil 620, a third sensing coil 630, a fourth sensing coil 640 and one or more additional sensing coils such as a sensing coil 680 and a lower sensing coil 690. The plurality of sensing coils may be housed in a RPI sensor housing 650. Additionally, a drive rod 675 or a drive shaft connected to a control rod may be configured to move up and down through the sensing coils during one or more operations of the nuclear reactor.

Each of the sensing coils may be associated with two wires and/or terminals. For example, first sensing coil 610 may be associated with a first wire 612 connected to a first terminal 605, and a second wire 614 connected to a second terminal 615. Similarly, second sensing coil 620 may be associated with wires 622, 624 connected to corresponding terminals of second sensing coil 620. Additionally, third sensing coil 630 may be associated with wires 632, 634, and fourth sensing coil 640 may be associated with wires 642, 644. The one or more additional sensing coils, such as sensing coil 680 and lower sensing coil 690, may also be associated with two wires, such as wires 682, 684 and wires 692, 694, respectively, connected to corresponding terminals of the additional sensing coils.

As current is applied to one or more of the coils, a magnetic field may be generated. As drive rod 675 passes through each coil, the inductance of the coil may be altered. When the control rod is inserted into the reactor core, drive rod 675 may not extend into some or all of the upper coils 610, 620, 630, and/or 640 and, therefore, the upper coils may have a relatively low inductance. As the control rod is retracted from the reactor core, drive rod 675 will eventually extend into one or more of the upper coils 610, 620, 630, 640, which may cause the inductance of the upper coils to increase.

In some examples, the location of the control rod may be determined from the difference in output voltages between adjacent coils. Output voltages associated with any one of the coils may be measured and/or otherwise determined from one or both wires that are operably coupled to the terminals of each coil. As mentioned above, the inductance of a particular coil may increase in response to the end of drive rod 675 entering a coil, such as sensing coil 630. The increased inductance of the coil may similarly increase the impedance of the coil and lower the output voltage of the coil as compared to a coil in which drive rod 675 has not been inserted, such as sensing coil 620.

Each of the coils may be electrically coupled to a voltage source by a first wire and/or terminal. The voltage source may be configured to feed an AC voltage through each of the coils. Additionally, the coils may be electrically coupled to the voltage source by a second, neutral, and/or grounded wire. Where each of the coils are electrically coupled to two wires, there may be twice as many wires as the number of coils. In some examples, the wires may pass through, or out of, RPI sensor housing 650. Additionally, the wires may pass through, or be routed out of, a surrounding containment structure, such as main containment vessel 220 and/or upper containment vessel 250 (FIG. 2). In an example RPI system where there are 78 sensing coils, 156 wires may be routed out through the containment structure.

Figure 7:
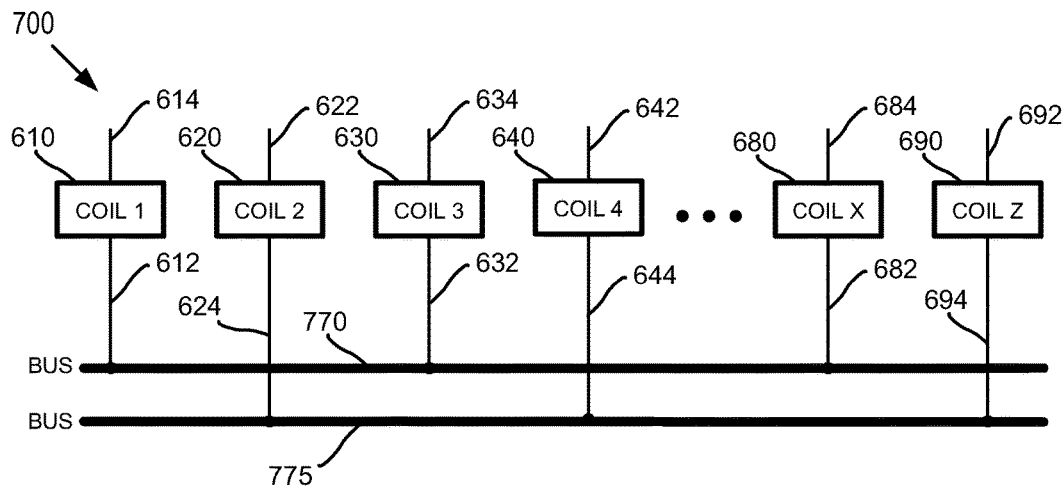
FIG. 7 illustrates a simplified schematic diagram for an example rod position indication system with a dual common bus power supply.

FIG. 7 illustrates a simplified schematic diagram for an example RPI system 700 with a dual common bus power supply. The dual common bus power supply may comprise a first bus 770 and a second bus 775. First bus 770 may be configured to provide a voltage supply to a first half of the coils, such as sensing coil 610, sensing coil 630, and one or more additional coils such as sensing coil 680. First bus 770 may be electrically coupled to coils 610, 630, 680 by wires 612, 632, 682, respectively. Similarly, second bus 775 may be configured to provide a voltage supply to a second half of the coils, such as sensing coil 620, sensing coil 640, and one or more additional coils such as sensing coil 690. Second bus 775 may be electrically coupled to coils 620, 640, 690 by wires 624, 644, 694, respectively.

First bus 770 and second bus 775 may be associated with two separate power supplies. Each power supply may be configured to supply 24 volts, or some other value. In some examples, the sensing coils may be electrically coupled to the buses in an alternatingly configuration. A first coil, such as sensing coil 610 may be electrically coupled to first bus 770 and a second coil, such as sensing coil 620 may be electrically coupled to second bus 775. Similarly a third coil, such as sensing coil 630 may be electrically coupled to first bus 770 and a fourth coil, such as sensing coil 640 may be electrically coupled to second bus 775. Subsequent and/or consecutive coils of the RPI system may be similarly coupled to the buses in an alternating fashion.

In some examples, an RPI system with alternating coils may be configured to continue operating at a lower resolution if a power supply associated with one of the buses becomes inoperable, is turned off, or otherwise stops supplying a voltage signal. For example, RPI system 700 may be configured to detect when the end of a drive rod is located between any two coils coupled to first bus 770, such as between sensing coil 610 and sensing coil 630, when no voltage is being supplied to sensing coil 620 by second bus 775.

By using one or more buses, the number of wires that are routed out through a surrounding containment structure, such as main containment vessel 220 and/or upper containment vessel 250 (FIG. 2), may be reduced. For example, half of the wires that are electrically coupled to the coils, such a wires 614, 622, 634, 642, 684, and 692 may be routed through the containment structure, whereas a second half of the wires, such as wires 612, 624, 632, 644, 682, and 694 may remain completely within the containment structure while coupling the coils to the one or more buses. For an RPI system where there may be 78 sensing coils, only 78 wires may be routed through the containment structure instead of 156 if no buses are used. In some examples, in addition to the half of the wires that are routed out through containment structure, first bus 770 and/or second bus 775 may also be routed out through the containment structure.

RPI system 700 may be configured to detect when a voltage difference occurs between two adjacent coils, such as sensing coil 620 and sensing coil 630, and based on the voltage difference may determine that the end of drive rod 675 is located within sensing coil 630 and/or between sensing coil 630 and the adjacent or next sensing coil 620 located above the end of drive rod 675. In some examples, the voltages associated with the coils may be measured or otherwise determined from one or more wire that are electrically coupled to the coils opposite the buses. For example, a voltage associated with sensing coil 620 may be measured on wire 622, and a voltage associated with sensing coil 630 may be measured on wire 634.

Additionally, RPI system 700 may be configured to determine that the end of drive rod 675 is proximate to or above sensing coil 630 until another difference in voltage is detected between two adjacent coils. For example, a subsequent difference in voltage as between sensing coil 620 and sensing coil 610 may indicate that the control rod is in the process of being withdrawn from the reactor core, whereas a subsequent difference in voltage as between sensing coil 630 and sensing coil 640 may indicate that the control rod is in the process of being inserted into the reactor core.

Figure 8:
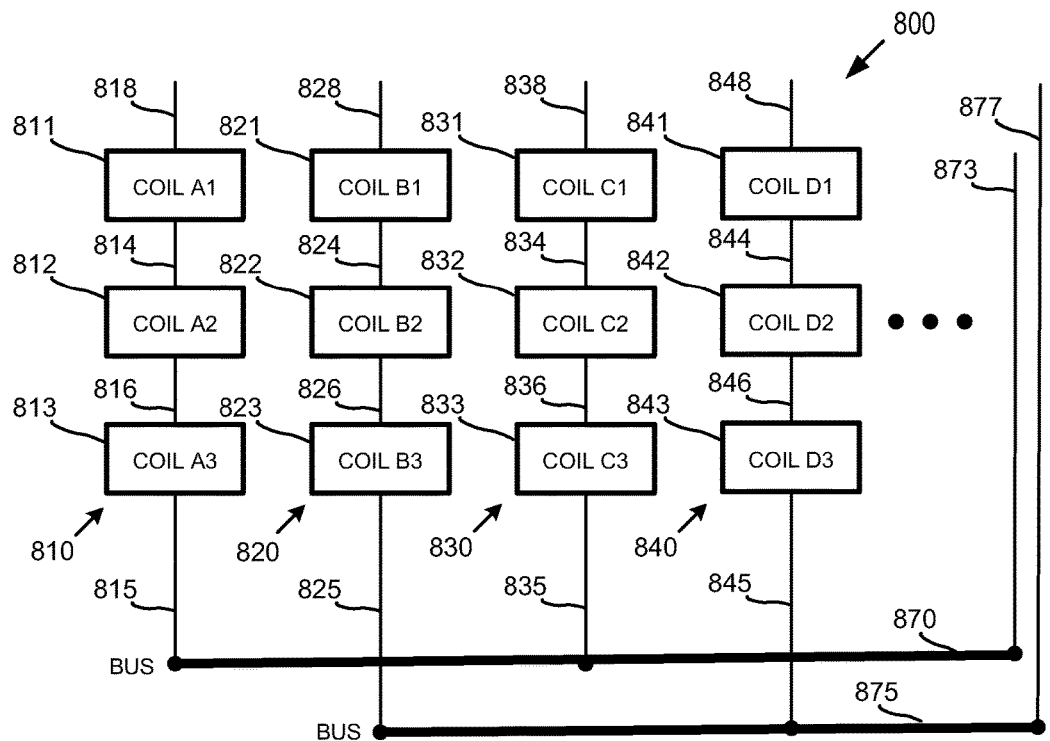
FIG. 8 illustrates a block diagram for an example rod position indication system with a plurality of grouped coil arrangements.

FIG. 8 illustrates a block diagram for an example RPI system 800 with a plurality of grouped coil arrangements. A first group of coils 810 may comprise three or more coils, such as coils 811, 812, and 813. Similarly, a second group of coils 820 may comprise coils 821, 822, 823, a third group of coils 830 may comprise coils 831, 832, 833, a fourth group of coils 840 may comprise coils 841, 842, 843, etc.

In some examples, half of the groups of coils may be electrically coupled to a first bus 870 and a second half of the groups of coils may be electrically coupled to a second bus 875. Additionally, the groups of coils may be coupled to the buses in an alternating or staggered arrangement. For example, the first and third groups of coils 810, 830 may be electrically coupled to first bus 870 and the second and fourth groups of coils 820, 840 may be electrically coupled to second bus 875.

Coils associated with the first group of coils 810 may be electrically coupled to each other in series. For example, coil 811 may be coupled to coil 812 by a connecting wire 814 and coil 812 may be coupled to coil 813 by a further connecting wire 816. Additionally, coil 813 may be electrically coupled to first bus 870 by a bus connection wire 815. The second group of coils 820 may also comprise a number of connecting wires 824 and 826 to couple coils 821, 822, and 823 in series, and a bus connection wire 825 may couple coil 823 to second bus 875. Similarly, third and fourth groups of coils 830, 840 may comprise a plurality of coils connected in series by one or more connecting wires, such as wires 834, 836, 844, and/or 846, and one or more bus connection wires 835, 845 may couple the last coil in each group to the first bus 870 and second bus 875, respectively. Although the groups of coils are each shown as comprising three coils, fewer or more coils may be connected in series.

Each group of coils may also comprise a routing wire. For example, first group of coils 810 may comprise routing wire 818, second group of coils 820 may comprise routing wire 828, third group of coils 830 may comprise routing wire 838, and fourth group of coils 840 may comprise routing wire 848. In some examples, one or more of the routing wires 818, 828, 838, 848 may be configured to be routed out through a surrounding containment structure, such as main containment vessel 220 and/or upper containment vessel 250 (FIG. 2). Additionally, one or more bus routing wires, such as bus routing wires 873 and 877, may be associated with first bus 870 and second bus 875, respectively.

First bus 870 and/or second bus 875 may be configured to provide a voltage source to one or more of the groups of coils. For example, first bus 870 may be configured to provide an AC voltage to first group of coils 810 via bus connection wire 815. The AC voltage may be provided to an input of coil 813. First bus 870 may be configured to supply 24 volts, or some other value. In some examples, the voltage provided by one or more of the buses may be dependent upon the number of sensing coils connected in series within any one group. For example, in order to provide 24 volts to each sensing device associated with a group of three sensing devices coupled in series, the bus may be associated with a 72 volt power supply, i.e., taking the product of the per-device voltage and the number of sensing devices in the group.

Additionally, an output of coil 813 may be electrically coupled to an input of coil 812 via connecting wire 816, and similarly an output of coil 812 may be electrically coupled to an input of coil 811 via connecting wire 814. The voltage associated with first group of coils 810 may be measured and/or otherwise determined from the output of coil 810 via routing wire 818. Similarly, voltages associated with the second, third, and/or fourth groups of coils 820, 830, 840 may be measured and/or otherwise determined via routing wires 828, 838, and 848, respectively.

In an example configuration where there are 78 coils in the RPI system, and each of the groups of coils comprises three coils connected in series, there may be 26 routing wires associated with the coils. Each of the 26 routing wires may be used to measure and/or determine a voltage signal, or some other type of signal, associated with the groups of coils. The number of routing wires may be further decreased by connecting more than three coils in series within one or more of the groups of coils. While the groups of coils are shown as including the same number of coils, in some examples, different numbers of coils may be connected in series in one or more of the groups of coils.

Figure 9:
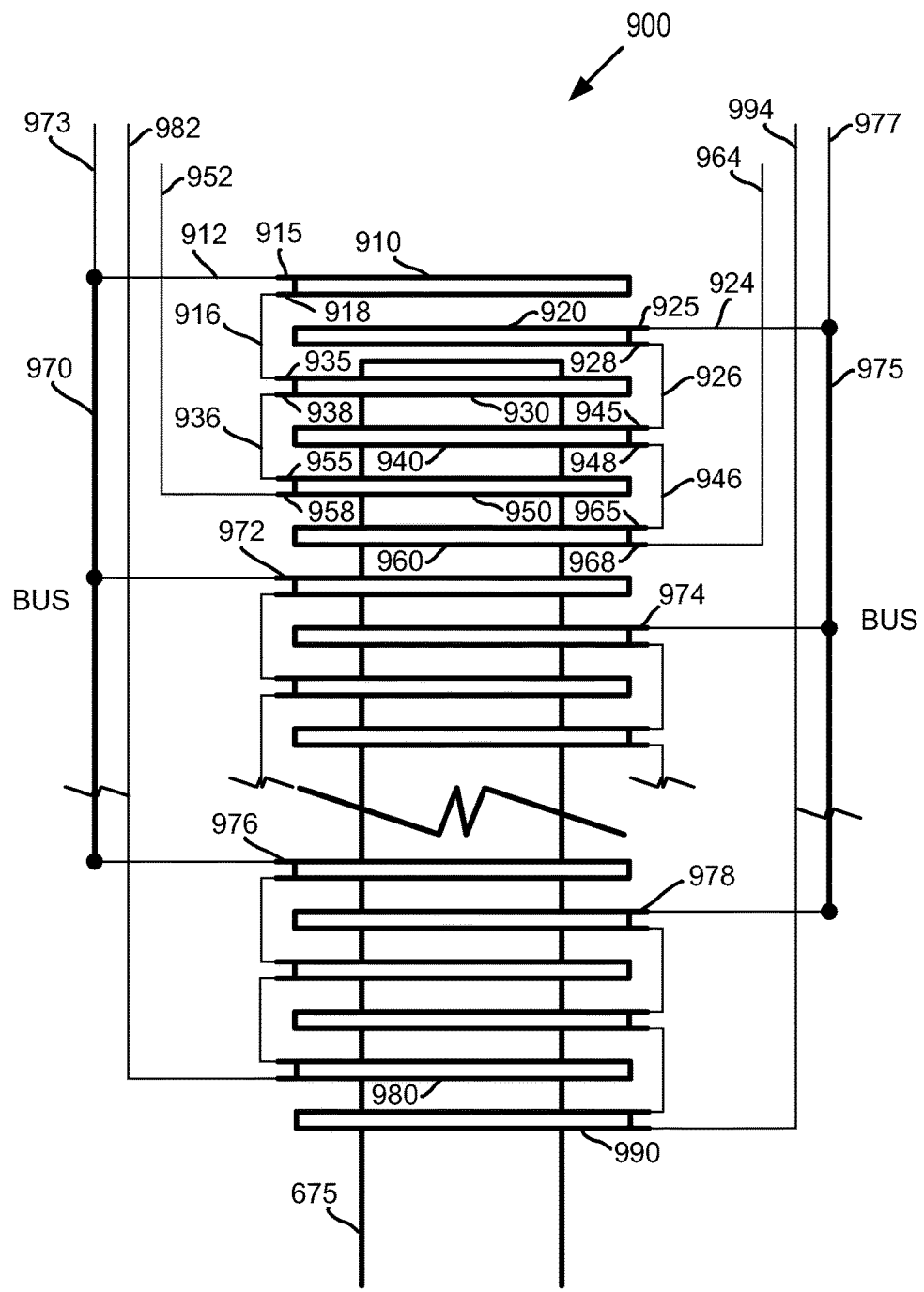
FIG. 9 illustrates an example rod position indication system.

FIG. 9 illustrates an example RPI system 900 configured to determine the position of a control rod operatively coupled to drive rod 675. RPI system 900 may comprise a plurality of grouped coil arrangements. A first group of coils may comprise three or more coils, such as coils 910, 930, and 950. Similarly, a second group of coils may comprise coils 920, 940, and 960. One or more additional groups of coils may also each comprise three or more coils, including coil 980 and coil 990.

In some examples, half of the groups of coils may be electrically coupled to a first bus 970 and a second half of the groups of coils may be electrically coupled to a second bus 975. Additionally, the groups of coils may be coupled to the buses in an alternating or staggered arrangement. For example, the first group of coils may be electrically coupled to first bus 970 and the second group of coils may be electrically coupled to second bus 975.

A first terminal 915 of first coil 910 may be electrically coupled to first bus 970 by a bus connection wire 912. Similarly, a first terminal 925 of second coil 920 may be electrically coupled to second bus 975 by a bus connection wire 924. Additionally, one or more terminals 976, 978 of the additional groups of coils including coils 980 and 990 may be electrically coupled to first bus 970 and to second bus 975, respectively.

Coils associated with the first group of coils may be electrically coupled to each other in series. For example, a second terminal 918 of first coil 910 may be coupled to a first terminal 935 of coil 930 by a connecting wire 916. A second terminal 938 of third coil 930 may be coupled to a first terminal 958 of fifth coil 950 by a connecting wire 936. Similarly, one or more terminals 928, 945, 948, 965 associated with the second group of coils may be electrically coupled together by one or more wires 926, 946. Although the groups of coils are each shown as comprising three coils, fewer or more coils may be connected together.

Each group of coils may also comprise a routing wire. For example, the first group of coils may comprise routing wire 952 electrically coupled to a second terminal 958 of fifth coil 950, and the second group of coils may comprise routing wire 964 electrically coupled to a second terminal 968 of sixth coil 960. Similarly, the one or more additional groups of coils may each be associated with a routing wire, such as routing wires 982, 994. In some examples, one or more of the routing wires 952, 964, 982, 994 may be configured to be routed out through a surrounding containment structure, such as main containment vessel 220 and/or upper containment vessel 250 (FIG. 2). Additionally, one or more bus routing wires, such as bus routing wires 973 and 977, may be associated with first bus 970 and second bus 975, respectively.

First bus 970 and/or second bus 975 may be configured to provide a voltage source to one or more of the groups of coils. For example, first bus 970 may be configured to provide a voltage to the first group of coils via bus connection wire 912. The voltage associated with the first group of coils may be measured and/or otherwise determined via routing wire 952. Similarly, second bus 975 may be configured to provide a voltage to the second group of coils via bus connection wire 924, and the voltage associated with the second group of coils may be measured and/or otherwise determined via routing wire 964.

In some examples, one or both of first bus 970 and second bus 977 may be configured to supply an AC signal to the first coil in each coil group, e.g., to coil 910 in the first coil group and to coil 920 in the second coil group. The AC signal may be associated with a bus voltage. In some examples the bus voltage may be determined based, at least in part, on the number of coils in each coil group. In examples in which each coil is associated with a particular coil voltage, such as 24 volts, the bus voltage may be determined by multiplying the coil voltage by the number of coils in the coil group. In a coil group comprising three coils, the bus voltage may be 72 volts.

Additionally, the bus voltage and/or coil voltage may be measured, calculated, or otherwise determined as a root mean square (RMS) of the voltage signal. Accordingly, first bus 970 and/or second bus 975 may be configured to provide and/or supply a signal with a 72 volt RMS output, or some other voltage output. The signal may be encoded.

Any two adjacent coils may be associated with a different coil group. In some examples, each coil within a coil group may be separated from each other by at least one coil associated with another coil group. Additionally, each coil may be electrically coupled to a different bus and/or power supply than the adjacent coils.

Additional accuracy and sensitivity may be gained by measuring the current from a coil group, at the routing wire 952, 964, 982, 994 for example, and calculating the phase relationship to the AC voltage at the same point. The difference in the phase angle will correspond to the position of the drive rod within a coil group as a function of the coil group inductance.

Figure 10:
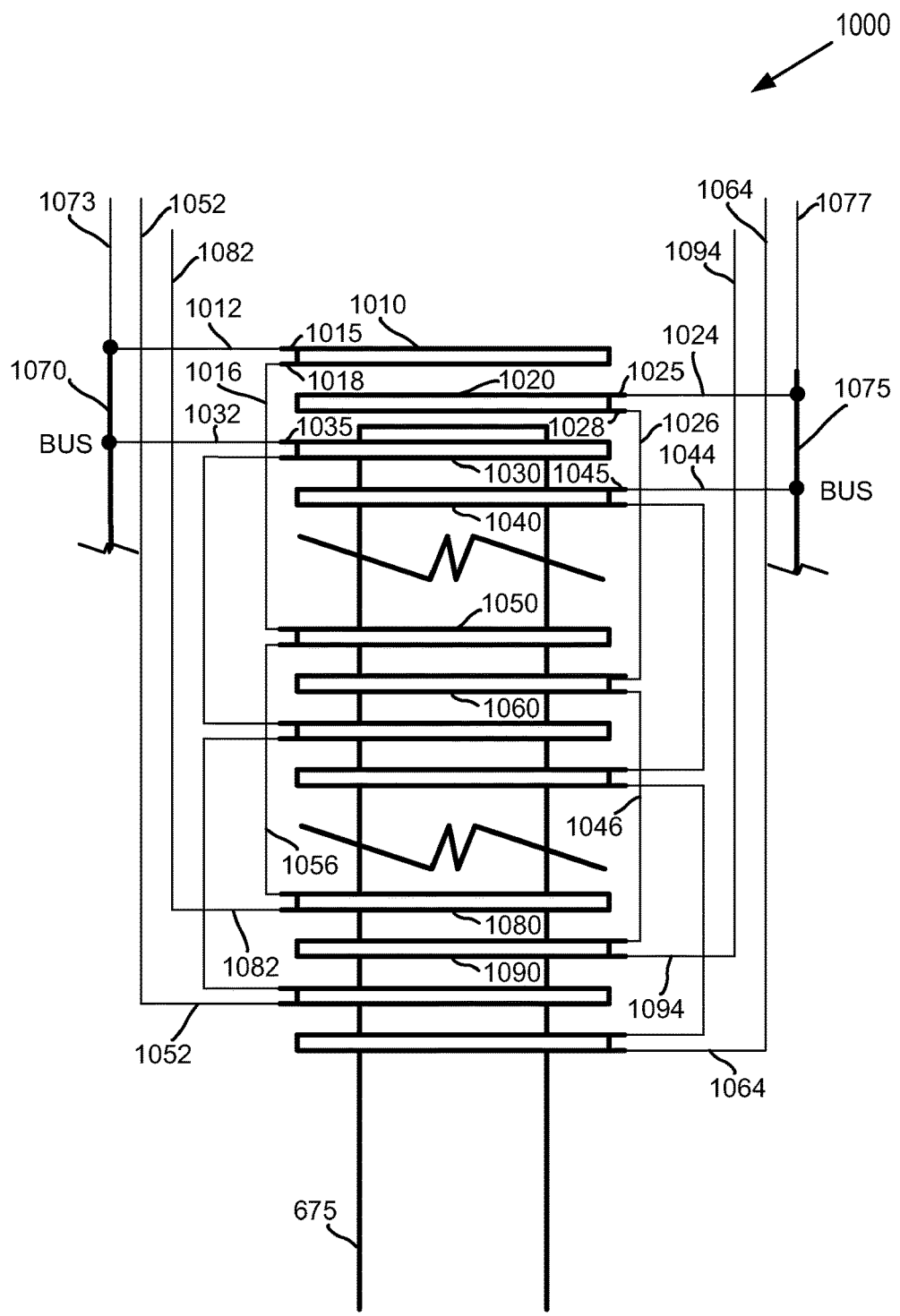
FIG. 10 illustrates another example rod position indication system.

FIG. 10 illustrates another example RPI system 1000 configured to determine the position of a control rod operatively coupled to drive rod 675. RPI system 1000 may comprise a plurality of coils, such as coils 1010, 1020, 1030, 1040, 1050, 1060, 1080, and 1090 configured in a number of coil groups. Additionally, each coil group may be associated with a number of coils.

The coils in RPI system 1000 may be configured as and/or schematically arranged into a number of portions. The number of portions may correspond to the number of coils associated with each coil group. In examples in which there are three coils associated with each coil group, the RPI system 1000 may comprise coils arranged into three portions. For example, a first or upper coil portion may be associated with a number of coils such as coils 1010, 1020, 1030, 1040, a second or intermediate coil portion may be associated with a number of coils such as coils 1050, 1060, and a third or lower coil portion may be associated with a number of coils such as coils 1080, 1090.

A first group of coils may comprise a first coil, such as coil 1010, selected from the first coil portion, a second coil, such as coil 1050, selected from the second coil portion, and a third coil, such as coil 1080, selected from the third coil portion. A first terminal 1015 of coil 1010 may be electrically coupled to first bus 1070 by a bus connection wire 1012. Additionally, connecting wire 1016 may electrically couple coil 1010 to coil 1050 via a second terminal 1018 of coil 1010. Coil 1010 may be electrically coupled in series to coil 1050 and to coil 1080 by connecting wire 1016 and by connecting wire 1056, respectively.

A second group of coils including coils 1020, 1060, 1090 may also be selected from the first, second, and third portions of RPI system 1000. A first terminal 1025 of coil 1020 may be electrically coupled to second bus 1075 by a bus connection wire 1024. Additionally, connecting wire 1026 may electrically couple coil 1020 to coil 1060 via a second terminal 1028 of coil 1020. Coil 1020 may be electrically coupled in series to coil 1060 and to coil 1090 by connecting wire 1026 and by connecting wire 1046, respectively.

One or more additional groups of coils, such as groups including coils 1030 and 1040, may be configured similarly as the first and/or second groups of coils. For example, a third coil group associated with coil 1030 may be electrically coupled to first bus 1070 by a bus connection wire 1032 via a first terminal 1035 of coil 1030, and a fourth coil group associated with coil 1040 may be electrically coupled to second bus 1075 by a bus connection wire 1044 via a first terminal 1045 of coil 1040.

All of the coils associated with any one coil group may be separated from each by a number of intervening coils from other coil groups. For example, a first coil 1010 of the first coil group may be separated from the second coil 1050 of the first coil group by at least coils 1020, 1030, and 1040. Each of the intervening coils may be associated with different coil groups. In an example RPI system associated with a total of 78 coils separated into 26 coil groups, there may be 25 intervening coils between the coil 1010 and coil 1050. Similarly, there may be 25 intervening coils between coil 1050 and coil 1080. In some examples, any two adjacent coils may be electrically coupled to a different bus and/or to a different power supply.

Each group of coils may also comprise a routing wire. For example, the first group of coils may comprise routing wire 1082 electrically coupled to the third or final coil 1080 of the first group of coils, and the second group of coils may comprise routing wire 1094 electrically coupled to the third or final coil 1090 of the second group of coils. The voltage associated with the first group of coils may be measured and/or otherwise determined via routing wire 1082. Similarly, the voltage associated with the second group of coils may be measured and/or otherwise determined via routing wire 1094. Similarly, the one or more additional groups of coils may each be associated with a routing wire, such as routing wires 1052, 1064.

In some examples, one or more of the routing wires 1052, 1064, 1082, 1094 may be configured to be routed out through a surrounding containment structure, such as main containment vessel 220 and/or upper containment vessel 250 (FIG. 2). Additionally, one or more bus routing wires, such as bus routing wires 1073 and 1077, may be associated with first bus 1070 and second bus 1075, respectively.

By arranging the coils in a number of portions and by selecting one coil from each portion to belong to a coil group, the coils associated with a single portion of RPI system 1000 may all be directly coupled to one or more buses 1070, 1075. For example, coils associated with the first or upper coil portion, such as coils 1010, 1020, 1030, 1040 may all be directly coupled to one or more buses 1070, 1075. Additionally, all the coils in the intermediate and lower coil portions, such as coils 1050, 1060, 1080, 1090, may be may be indirectly coupled to one or more of buses 1070, 1075. On the other hand, coils associated with the lower coil portion, such as coils 1080, 1090, may all be directly coupled to routing wires, such as routing wires 1082, 1094, and all the coils in the intermediate and upper coil portions may be may be indirectly coupled to the routing wires.

FIGS. 6-10 illustrate various example configurations for electrically coupling coils as a number of coil groups, and other RPI systems may be configured with different coil arrangements and/or groupings. For example, a number of adjacent coils may be grouped together instead of having intervening coils from different coil groups interspersed between the coils in the particular coil group. Additionally, two coils within a particular coil group may be separated by any number of intervening coils from other coils groups. For example the number of intervening coils may range from between one to twenty five coils for an RPI system having 78 coils. In some examples, sensing devices other than sensing coils may be used in the RPI system. For example, one or more of the sensing devices may comprise proximity sensors, magnetic sensors, Hall Effect sensors, other types of sensing devices, or any combination thereof.

Figure 11:
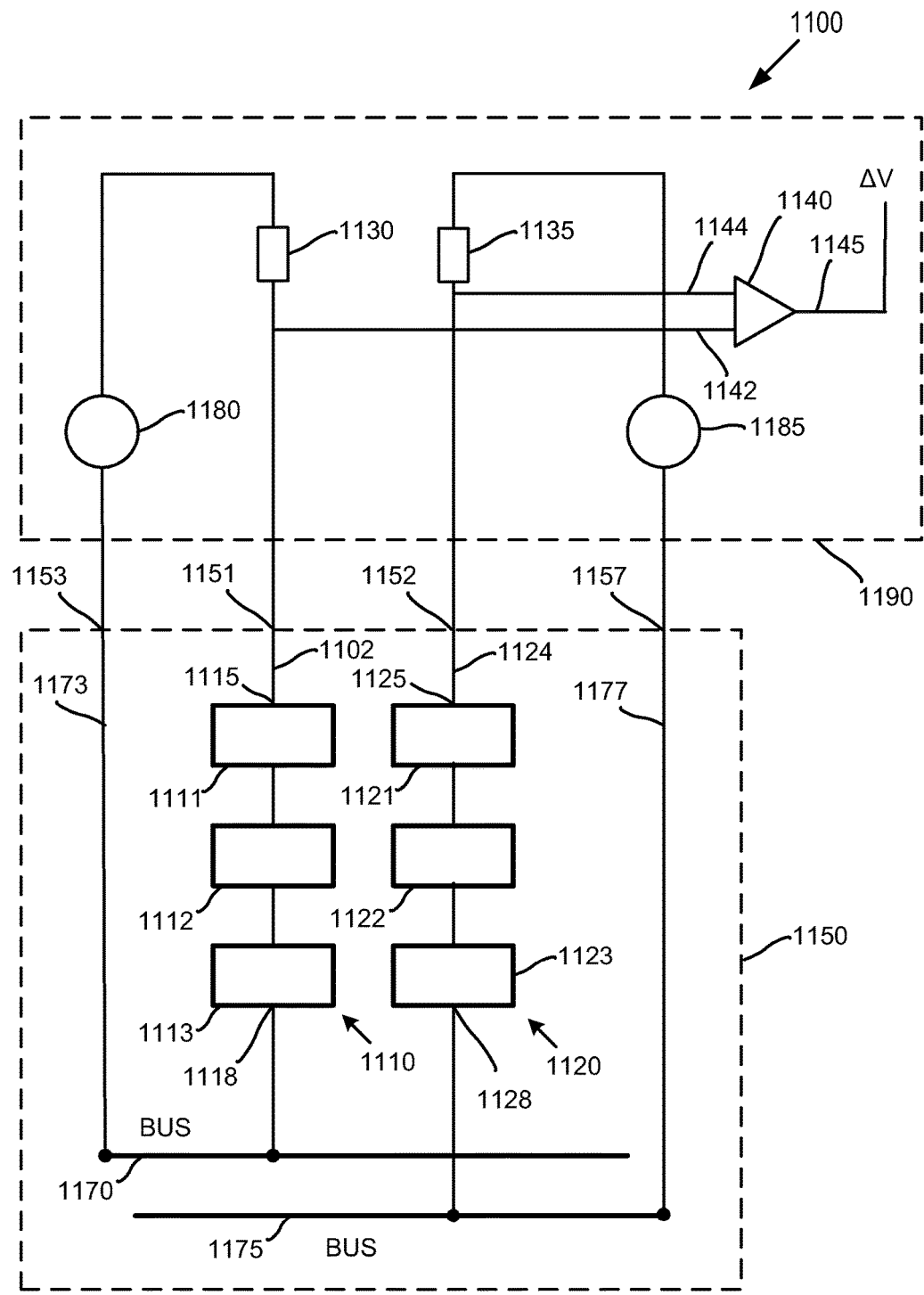
FIG. 11 illustrates a simplified schematic diagram for an example rod position indication system.

FIG. 11 illustrates a simplified schematic diagram for an example RPI system 1100. RPI system 1100 may comprise a number of sensing devices, configured to determine the position of a control rod operatively coupled to a drive rod. The control rod may be configured to be alternatively withdrawn from and inserted into a reactor core. A number of sensing devices may be linearly arranged along a path of the drive rod. An end of the drive rod may pass by or through one or more of the sensing devices in response to the withdrawal of the control rod from the reactor core.

In some examples, the drive rod may be movably inserted within or by one or more of a plurality of sensing devices, such as sensing devices 1111, 1112, 1113, 1121, 1122, and 1123. Additionally, the plurality of sensing devices may be schematically arranged into a plurality of groups of sensing devices. Each group may comprise two or more of sensing devices electrically coupled together in series.

A first group of sensing devices 1110 may comprise sensing devices 1111, 1112, and 1113, and a second group of sensing devices 1120 may comprise sensing devices 1121, 1122, and 1123. In some examples, sensing devices 1111, 1112, and 1113 be electrically coupled together in series. Additionally sensing devices 1121, 1122, and 1123 may be electrically coupled together in series.

RPI system 1100 may be configured similarly as the example RPI system 900 illustrated in FIG. 9. For example, the first sensing device 1121 of the second group of sensing devices 1120 may be linearly arranged between the first sensing device 1111 and the second sensing device 1112 of the first group of sensing devices 1110. Additionally, the second sensing device 1112 of the first group of sensing devices 1110 may be linearly arranged between the first sensing device 1121 and the second sensing device 1122 of the second group of sensing devices 1120. In this manner, the sensing devices of one group of sensing devices may be interleaved and/or separated by intervening sensing devices associated with one or more other groups of sensing devices. In still other examples, RPI system 1100 may be configured similarly as the example RPI system 1000 illustrated in FIG. 10.

First group of sensing devices 1110 may be electrically coupled to a bus, such as a first bus 1170, via a terminal 1118 of sensing device 1113. Additionally, sensing device 1111 may comprise a terminal 1115 electrically coupled to a routing wire 1102. Second group of coils 1120 may be electrically coupled to a bus, such as a second bus 1175, via a terminal 1128 of sensing device 1123, and sensing device 1121 may comprise a terminal 1125 electrically coupled to a routing wire 1124. Additionally, first and second buses 1170 and 1175 may be associated with bus routing wires 1173 and 1177 respectively.

First group of sensing devices 1110, second group of sensing devices 1120, first bus 1170, and second bus 1175 may all be at least partially housed within a containment structure 1150. Containment structure 1150 may be sealed to the outside environment. One or more penetrations, such as penetrations 1151, 1152, 1153, and 1157, may be configured to allow routing wires 1102, 1124 and/or bus routing wires 1173, 1177 to be routed through containment structure 1150. In some examples, one or more routing wires may be routed through the same penetration.

Additionally, RPI system 1100 may comprise a RPI monitoring device 1190. RPI monitoring device 1190 may be located outside of containment structure 1150. One or more of the routing wires 1102, 1124 and/or bus routing wires 1173, 1177 may be routed to or into RPI monitoring device 1190.

RPI monitoring device 1190 may be electrically coupled to each group of sensing devices by a routing wire. RPI monitoring device 1190 may be located remotely from containment structure 1150, such as in an operations room or control center of a nuclear power plant. Additionally, the reactor core may be housed in a reactor pressure vessel contained within the containment vessel, such that the groups of sensing devices may be located in a containment region formed between the reactor pressure vessel and the containment vessel.

The total number of routing wires associated with the groups of sensing devices that are routed out of containment structure 1150, such as routing wires 1115 and 1124, may be less than half of the number of sensing devices.

The groups of sensing devices may comprise sensing coils configured with first and second terminals that electrically couple the sensing coils in series. A first terminal of a first sensing coil, such as terminal 1115, may be electrically coupled to RPI monitoring device 1190 via a routing wire, such as routing wire 1115. Similarly, a second terminal of the first sensing coil, such as terminal, may be electrically coupled to a first terminal of a second sensing coil.

Additionally, a second terminal of the second sensing coil may be electrically coupled to a first terminal of a third sensing coil. A second terminal of the third or final sensing coil, such as terminal 1118, may be electrically coupled to at least one of the one or more buses, such as first bus 1170. In some examples, the total number of routing wires associated with the groups of sensing devices that are routed to RPI monitoring device 1190 may be approximately one third of the number of sensing devices.

RPI monitoring device 1190 may be configured to measure and/or otherwise determine the position of a control rod based on one or more signals received on routing wires 1102, 1124 and/or on bus routing wires 1173, 1177. RPI monitoring device 1190 may comprise one or more circuit components, such as a first circuit component 1130 and/or a second circuit component 1135. In some examples, first circuit component 1130 and/or second circuit component 1135 may comprise one or more resistors, such as current sensing resistors. First circuit component 1130 may be electrically coupled to first group of sensing devices 1110 via routing wire 1102. Similarly, second circuit component 1135 may be electrically coupled to second group of sensing devices 1120 via routing wire 1124.

RPI monitoring device 1190 may further comprise one or more power supplies, such as a first power supply 1180 and/or a second power supply 1185. First bus 1170 may be electrically coupled to first power supply 1180 via bus routing wire 1173. Similarly, second bus 1175 may be electrically coupled to second power supply 1185 via bus routing wire 1177. First circuit component 1130 may be electrically coupled to first power supply 1180 and second circuit component 1135 may be electrically coupled to second power supply 1185. Additionally, first circuit component 1130, second circuit component 1135, first power supply 1180, and/or second power supply 1185 may be located outside of containment structure 1150.

A comparator 1140 may be configured to compare an electrical property, such as a current or a voltage, associated with one or both of the first circuit component 1130 and the second circuit component 1135. For example, first circuit component 1130 may comprise a first resistor, and second circuit component 1135 may comprise a second resistor. Comparator 1140 may be configured to compare a first current across the first resistor to a second current across the second resistor.

The electrical property may be compared based, at least in part, on input received over input lines 1142 and 1144 which couple first circuit component 1130 and second circuit component 1135 to comparator 1140. Additionally, comparator 1140 may be configured to output rod position information on output line 1145.

RPI monitoring device 1190 may be configured to determine a difference between signals associated with two or more sensing devices and/or groups of sensing devices, such as first group of sensing devices 1110 and second group of sensing devices 1120. In some examples, RPI monitoring device 1190 may be configured to determine a difference 1160 in output voltage between the two or more groups of sensing devices based, at least in part, on differences in the electrical property of the signals transmitted over input lines 1142, 1144.

In example RPI systems where each group comprises more than two sensing devices, the signals transmitted over input lines 1142 and/or 1144 may be evaluated to determine which sensing device within the group of sensing devices is proximate to the end of the drive rod. The signal transmitted over input line 1142 may be associated with a range of values. In some examples, the range of values may comprise step values. A first value may be associated with a position of drive rod proximate to first sensing device 1111, a second value may be associated with a position of drive rod proximate to second sensing device 1112, and a third value may be associated with a position of drive rod proximate to third sensing device 1113. In some examples, the value associated with the signal may indicate that the drive rod is generally located between two sensing devices.

Figure 12:
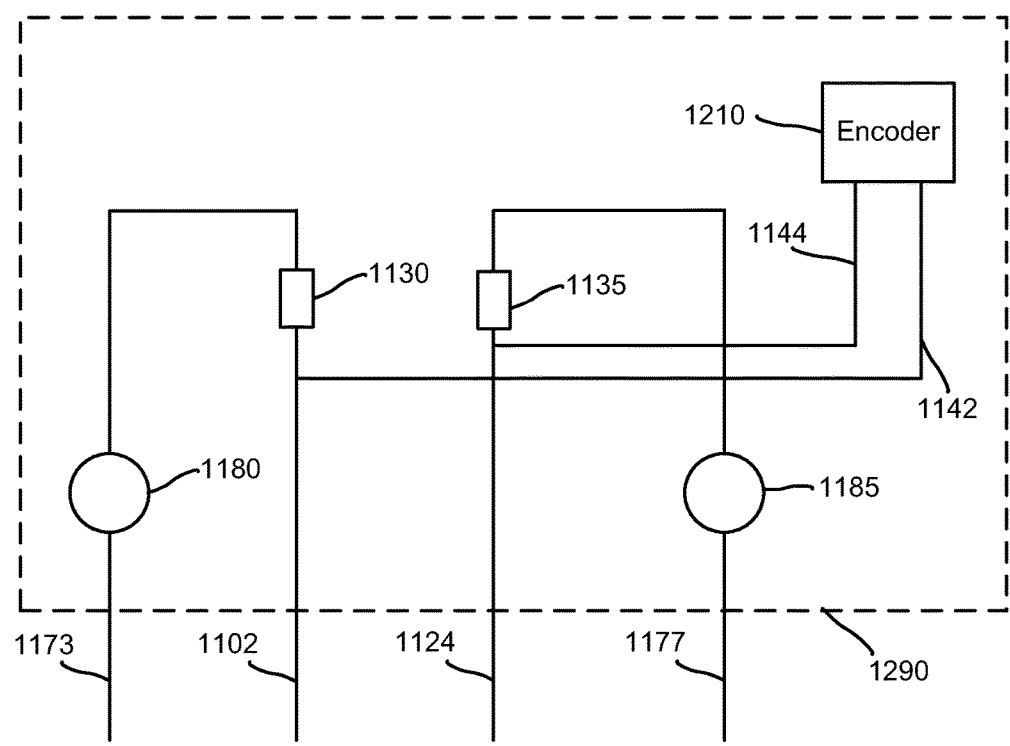
FIG. 12 illustrates a simplified schematic diagram for another rod position indication monitoring device.

FIG. 12 illustrates a simplified schematic diagram for another RPI monitoring device 1290. RPI monitoring device 1290 may include an RPI encoder 1210 electrically coupled to one or more of the input lines from the groups of sensing devices, such as input lines 1142, 1144. The RPI encoder 1210 may be configured to determine a position of the control rod based, at least in part, on the signal output from the one or more input lines 1142, 1144.

The RPI encoder 1210 may measure an electrical property present on an input line. The electrical property may comprise an AC voltage that has been phase shifted relative to the input line signal due to the inductance of its associated coil group. A second electrical property may comprise an AC current that has been phase shifted relative to the input line signal due to the inductance of its associated coil group. The measured value of the difference in phase between the AC voltage signal and the AC current signal may correspond to a sensing device and/or to a group of sensing devices associated with the position of the drive rod. The RPI encoder 1210 may determine which sensing device an upper end of the drive rod is proximate to based, at least in part, on a measured value of the electrical property. In some examples, the RPI encoder 1210 may combine the measured values of the electrical property for each input line in an RPI system, such as by summing the measured values. The RPI encoder 1210 may determine which coil in the RPI system the upper end of the drive rod is proximate to based, at least in part, on the combined measured values.

Figure 13:
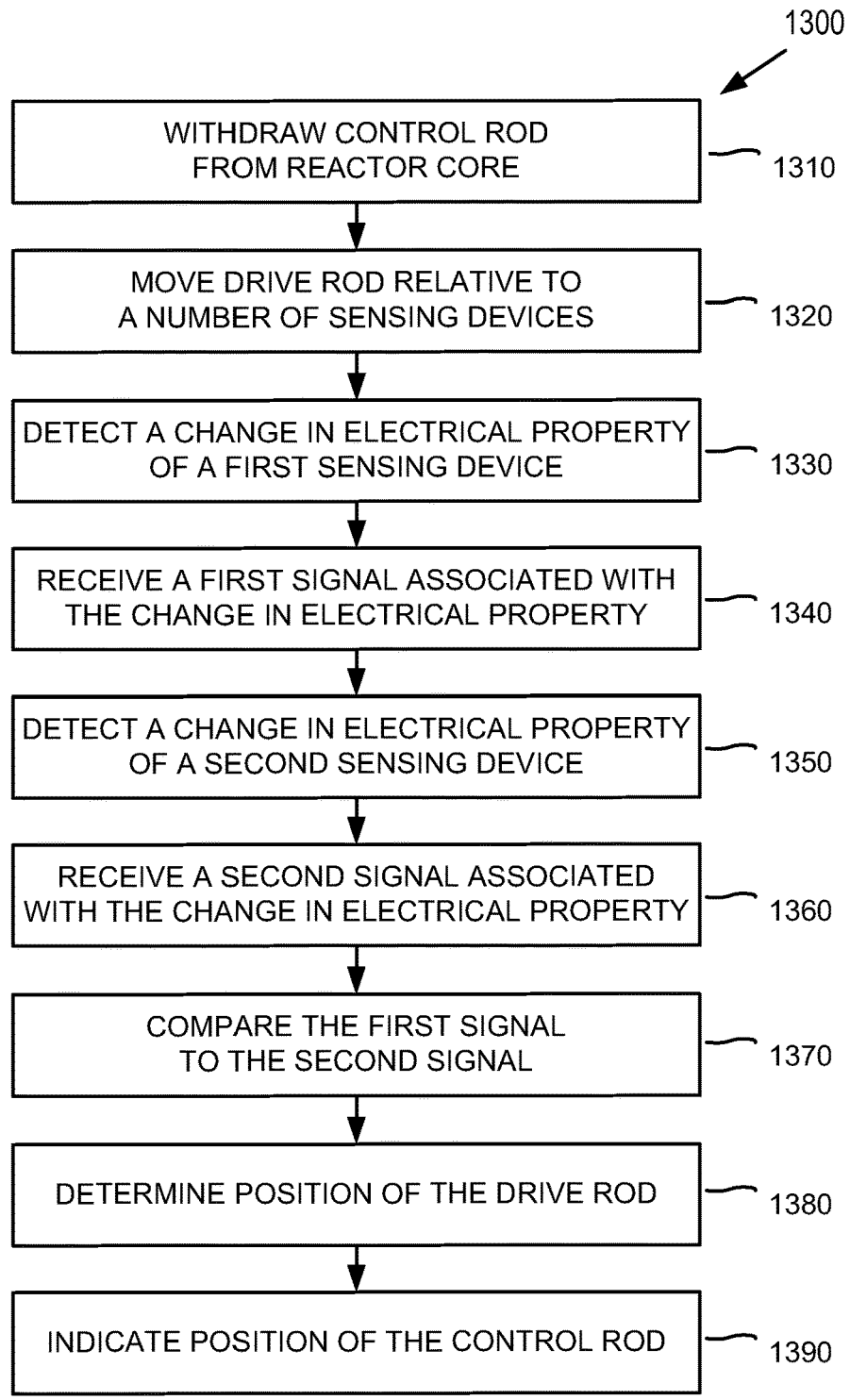
FIG. 13 illustrates an example process for indicating a control rod position.

FIG. 13 illustrates an example process 1300 for indicating a control rod position. At operation 1310, a control rod may be withdrawn from and/or moved relative to a reactor core. The control rod may be operably coupled to a drive rod of a control rod drive mechanism.

At operation 1320, the drive rod may be configured to move relative to a number of sensing devices associated with a rod position indicator (RPI) apparatus in response to withdrawing the control rod. The number of sensing devices may be arranged along a path of the drive rod. In some examples, the number of sensing devices may be linearly arranged along the path of the drive rod.

Additionally, the sensing devices may be arranged into a plurality of groups, such that each group may comprise two or more of the sensing devices electrically coupled together in series. In some examples, each group may consist of three sensing devices coupled together in series. The RPI apparatus may be electrically coupled to each group of sensing devices by a separate routing wire.

At operation 1330, a change in electrical property of a first sensing device may be detected or otherwise determined based, at least in part, on an end of the drive rod located in proximity to the first sensing device. The first sensing device may be associated with a first group of sensing devices comprising the first sensing device and a third sensing device electrically coupled together in series.

At operation 1340, a first signal associated with the change in electrical property of the first sensing device may be received at the RPI apparatus. In some examples, the RPI apparatus may comprise a first circuit component electrically coupled to the first group of sensing devices. The first signal may be received from the first circuit component and/or from the first group of sensing devices.

At operation 1350, a change in electrical property of a second sensing device may be detected or otherwise determined based, at least in part, on the end of the drive rod located in proximity to the second sensing device. The second sensing device may be associated with a second group of sensing devices comprising the second sensing device and a fourth sensing device electrically coupled together in series.

At operation 1360, a second signal associated with the change in electrical property of the second sensing device may be received at the RPI apparatus. In some examples, the RPI apparatus may comprise a second circuit component electrically coupled to the second group of sensing devices. The second signal may be received from second circuit component and/or from the second group of sensing devices.

The second sensing device associated with the second group of sensing devices may be linearly arranged between the first sensing device and the third sensing device of the first group of sensing devices. Additionally, the third sensing device associated with the first group of sensing devices may be linearly arranged between the second sensing device and the fourth sensing device of the second group of sensing devices.

At operation 1370, the first signal may be compared to the second signal. In some examples, the first circuit component may comprise a first resistor, and the second circuit component may comprise a second resistor. The first signal may comprise and/or otherwise be associated with a first current across the first resistor. Similarly, the second signal may comprise and/or otherwise be associated with a second current across the second resistor. In still other examples, a RMS voltage value associated with the first circuit component may be compared to a RMS voltage value associated with the second circuit component.

At operation 1380, the position of the drive rod relative to the number of sensing devices may be determined based, at least in part, on the comparison of the first signal to the second signal.

At operation 1390, the position of the control rod may be indicated in response to determining the relative position of the drive rod.

The drive rod and the groups of sensing devices may all be located with a containment structure. The RPI apparatus may be located outside of the containment structure. In some examples, the RPI apparatus may be electrically coupled to each group of sensing devices by a single routing wire, and the total number of routing wires associated with the groups of sensing devices that are routed out of the containment structure may be less than half of the number of sensing devices. In some examples, the total number of routing wires associated with the groups of sensing devices that are routed out of the containment structure may be approximately one third the number of sensing devices.

Although the examples provided herein have primarily described a pressurized water reactor and/or a light water reactor, it should be apparent to one skilled in the art that the examples may be applied to other types of power systems. For example, the examples or variations thereof may also be made operable with a boiling water reactor, sodium liquid metal reactor, gas cooled reactor, pebble-bed reactor, and/or other types of reactor designs.

Some or all of the examples provided herein may be used to measure the drive rod position for one or more types of CRDM assemblies that may be different than that described, for example CRDM assemblies that may comprise a lead screw and roller nut type of drive or a hydraulic drive, such as for a boiling water reactor. Additionally, one or more of the examples may be used to measure the position of other types of drive rods in sealed enclosures that may also utilize a reduced number of electrical connections. For example, one or more of the examples may be used to measure the position of a piston of a hydraulic cylinder It should be noted that examples are not limited to any particular type of reactor cooling mechanism, nor to any particular type of fuel employed to produce heat within or associated with a nuclear reaction. Any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the following claims.

The invention claimed is:

1. A rod position indicator system comprising:
   a drive rod operably coupled to a control rod, wherein the control rod is configured to be both withdrawn from and inserted into a reactor core;
   a number of sensing devices arranged along a path of the drive rod, wherein an end of the drive rod passes by one or more of the sensing devices in response to movement of the control rod with respect to the reactor core, wherein the sensing devices are arranged into a plurality of groups, each group comprising two or more of the sensing devices electrically coupled together and each positioned at different vertical locations along the path of the drive rod; and
   a control rod monitoring device electrically and separately coupled to each group of sensing devices by a separate set of routing wires.

2. The rod position indicator system of claim 1, wherein a total number of the routing wires connected to the groups of sensing devices that are routed out of the containment vessel is less than half of the number of sensing devices.

3. The rod position indicator system of claim 2, including multiple groups of the sensing devices each connected by a first terminal through a separate routing wire to the control rod monitoring device and connected by a second terminal through a same bus to the control rod monitoring device.

4. The rod position indicator system of claim 1, wherein the sensing devices in a first one of the plurality of groups are located in alternating positions in-between the sensing devices in a second one of the plurality of groups.

5. A rod position indicator system comprising:
   a drive rod operably coupled to a control rod, wherein the control rod is configured to be both withdrawn from and inserted into a reactor core;
   a number of sensing devices arranged along a path of the drive rod, wherein an end of the drive rod passes by one or more of the sensing devices in response to movement of the control rod with respect to the reactor core, and wherein the sensing devices are arranged into a plurality of groups, each group comprising two or more of the sensing devices electrically coupled together; and
   a control rod monitoring device electrically coupled to each group of sensing devices by a routing wire, wherein the groups of sensing devices comprise sensing coils configured with first and second terminals that electrically couple the sensing coils in series, wherein a first terminal of a first sensing coil is electrically coupled to the control rod monitoring device via the routing wire, wherein a second terminal of the first sensing coil is electrically coupled to a first terminal of a second sensing coil, and wherein a second terminal of the second sensing coil is electrically coupled to a first terminal of a third sensing coil.

6. The rod position indicator system of claim 5, further comprising one or more buses, wherein a second terminal of the third sensing coil is electrically coupled to at least one of the one or more buses, and wherein a total number of routing wires associated with the groups of sensing devices that are routed to the control rod monitoring device is approximately one third of the number of sensing devices.

7. The rod position indicator system of claim 1, wherein the control rod monitoring device comprises:
   a first circuit component electrically coupled to a first group of sensing devices comprising a first sensing device electrically coupled to a third sensing device in series;
   a second circuit component electrically coupled to a second group of sensing devices comprising a second sensing device electrically coupled to a fourth sensing device in series; and
   a comparator configured to compare a first electrical property associated with the first circuit component to a second electrical property associated with the second circuit component to determine a position of the drive rod relative to the number of sensing devices.

8. The rod position indicator system of claim 7, wherein the second sensing device of the second group of sensing devices is linearly arranged between the first sensing device and the third sensing device of the first group of sensing devices, and wherein the third sensing device of the first group of sensing devices is linearly arranged between the second sensing device and the fourth sensing device of the second group of sensing devices.

9. The rod position indicator system of claim 7, wherein the first circuit component comprises a first resistor, wherein the second circuit component comprises a second resistor, and wherein the first resistor and the second resistor are electrically coupled together in series.

10. The rod position indicator system of claim 7, wherein the comparator comprises an encoder configured to determine root mean squared (RMS) values of the first and second electrical properties.

11. A rod position indicator system comprising:
a drive rod operably coupled to a control rod, wherein the control rod is configured to be both withdrawn from and inserted into a reactor core;
a number of sensing devices arranged along a path of the drive rod, wherein an end of the drive rod passes by one or more of the sensing devices in response to movement of the control rod with respect to the reactor core, and wherein the sensing devices are arranged into a plurality of groups, each group comprising two or more of the sensing devices electrically coupled together;
multiple buses each separately coupled to a different one of the groups of sensing devices;
multiple routing wires each separately coupled to a different one of the groups of sensing devices; and
a control rod monitoring device separately coupled to the multiple buses and routing wires coupled to each of the groups of sensing devices.

12. The rod position indicator system of claim 11, wherein at least some of the sensing devices in some of the groups are separately coupled together in series and each positioned at different vertical locations along the path of the drive rod.

13. The rod position indicator system of claim 12, wherein the sensing devices in at least some of the groups are separately coupled together in series between one of the multiple buses and one of the routing wires.

14. The rod position indicator system of claim 12, wherein the multiple buses are each coupled to two or more of the different groups of sensing devices.

15. The rod position indicator system of claim 11, wherein the sensing devices in a first one of the groups are located in alternating positions in-between the sensing devices in a second one of the groups.

* * * * *